United States Patent
Shober et al.

(10) Patent No.: US 6,487,484 B1
(45) Date of Patent: Nov. 26, 2002

(54) SHIFTING APPARATUS FOR AN AUTOMATIC TRANSMISSION THAT IS ADAPTED TO PROVIDE INSTALLATION FLEXIBILITY WHERE SPACE IS LIMITED WITHIN A MOTOR VEHICLE

(75) Inventors: Joseph R. Shober, Phillipsburg, NJ (US); John T. Shober, Jr., Bethlehem, PA (US); Michael J. Shober, Easton, PA (US); Albert M. Giovanni, Windgap, PA (US)

(73) Assignee: Shobers, Inc., Easton, PA (US)

( * ) Notice: Subject to any disclaimer, the term of this patent is extended or adjusted under 35 U.S.C. 154(b) by 0 days.

(21) Appl. No.: 09/767,769

(22) Filed: Jan. 23, 2001

Related U.S. Application Data (63) Continuation-in-part of application No. 09/263,476, filed on Mar. 5, 1999.

(51) Int. Cl.⁷ .............................................. B60K 41/18
(52) U.S. Cl. ............................. 701/51; 701/55; 74/866; 74/335
(58) Field of Search ....................... 701/51, 68; 74/866, 74/335, 625

(56) References Cited

U.S. PATENT DOCUMENTS

| | | |
|---|---|---|
| 2,236,746 A | 4/1941 | Bush |
| 2,610,518 A | 9/1952 | Goedeke et al. |
| 2,658,403 A | 11/1953 | Marco |
| 2,788,675 A | 4/1957 | Hosea |
| 2,902,881 A | 9/1959 | Loffbourrow |
| 3,001,618 A | 9/1961 | McCordic et al. |
| 3,125,893 A | 3/1964 | Wolf-Dieter Bensinger |
| 3,780,597 A | 12/1973 | White |
| 4,790,204 A | 12/1988 | Tury et al. |
| 4,817,471 A | 4/1989 | Tury |
| 4,843,901 A | 7/1989 | Peterson et al. |
| 4,922,769 A | * 5/1990 | Tury ........................... 74/866 |
| 4,998,444 A | 3/1991 | Mabee |
| 5,042,314 A | 8/1991 | Rytter et al. |
| 5,085,106 A | 2/1992 | Bubnash |
| RE34,064 E | 9/1992 | Tury et al. |

FOREIGN PATENT DOCUMENTS

JP                60-176829          9/1985

* cited by examiner

Primary Examiner—William A. Cuchlinski, Jr
Assistant Examiner—Arthur Donnelly
(74) Attorney, Agent, or Firm—Caesar, Rivise, Bernstein, Cohen & Pokotilow, Ltd.

(57) ABSTRACT

A shifting apparatus is disclosed for use with an automatic transmission that is situated within a closely confined area within a vehicle. The transmission is of the type that includes an externally mounted shift position select lever that shifts the transmission from a present transmission shift position to a desired transmission shift position. The shifting apparatus includes an operator input means adapted to be mounted in the passenger compartment. It also includes a motor drive assembly adapted to be mounted within the vehicle at a location remote from the closely confined area. Through a flexible cable, the motor drive assembly engages the shift position select lever to impart rotational movement thereon to shift the transmission to a desired shift position.

12 Claims, 7 Drawing Sheets

SHIFTING APPARATUS FOR AN AUTOMATIC TRANSMISSION THAT IS ADAPTED TO PROVIDE INSTALLATION FLEXIBILITY WHERE SPACE IS LIMITED WITHIN A MOTOR VEHICLE

RELATED APPLICATIONS

This application is a continuation-in-part of U.S. application Ser. No. 09/263,476, filed on Mar. 5, 1999 (hereinafter "the '476 application") and claims priority under 35 U.S.C. §120 to the '476 application.

BACKGROUND OF THE INVENTION

The street rod industry has grown allowing many popular street rods to be built based on classic car or truck designs. In many cases, the basic design of a car serves as the foundation for a "street rod". In the case of a street rod, various departures are usually made from the design of the original vehicle, such as using higher performance engine or different transmission, parts of which may be left exposed rather than being covered, using a modem suspension and tires, etc. Often, it is the goal in the design of a street rod to increase performance characteristics through the use of after-market parts that were never available at the time of the classic car or truck design. An industry has developed for supplying such after-market parts for these street rods.

In many cases, the after-market parts are reproductions of the corresponding original equipment parts, though modern materials, such as fiberglass, are often used in their construction. Other after-market parts, which may not be reproductions of original parts, provide modern technologies and capabilities not available at the time of the design of the original classic car or truck. These after-market parts may not be reproductions of original parts, but rather, are intended to provide certain conveniences, performance enhancements, and/or safety enhancements that the original parts did not provide. Examples of such after-market parts are found in U.S. Pat. No. 5,494,011 (Haller) entitled High-Rise Intake Manifold For Performance Engines And Method For Manufacturing Same; U.S. Pat. No. 5,108,129 (Olsen) entitled Inner Fender Liner; and, U.S. Pat. No. 5,022,679 (Pazik) entitled Vehicle Gas Tank.

In many instances, motor vehicles and water craft are not designed to provide additional space to accommodate the installation of after-market parts. To the contrary, available space for installation of such parts within motor vehicles and water craft is usually scarce and often is closely confined. Additionally, access to available space within such vehicles may be difficult making installation of such parts difficult, time consuming and/or expensive. Thus, installers of after-market parts often must be creative in identifying suitable locations for installation of these parts. For example, after-market parts are frequently installed in the vehicle's trunk, under passenger seats, on the ceiling of the passenger compartment, etc. To address this challenge, designers of after-market parts endeavor to design these parts in ways that enables their installation in a number of alternative locations within a vehicle such as a street rod in the event that installation within a first desired location is not possible. By designing after-market parts with this flexibility, their attractiveness to after-market installers increases, thus increasing sales. An after-market installer will be more likely to purchase an after-market part if that part can be installed in any one of a number of alternative locations within the motor vehicle rather than in just one location.

The commonly owned '476 patent application entitled "A Shifting Apparatus For An Automatic Transmission Including A Vehicle Security System" discloses a shifting apparatus that includes a key pad module, an actuator module and a controller. The key pad module is adapted to be positioned on the dash board of the passenger compartment of the motor vehicle for convenient access by the driver. The actuator module is arranged for rotating the transmission's shift position select shaft which, in turn, operates internal devices within the transmission to position the transmission in a plurality of transmission positions such as park, neutral, drive, reverse, etc. Under the '476 application the actuator module is arranged for affixation directly to the transmission housing in proximity to the transmission's shift position select shaft. There are no other locations disclosed in this application for mounting the actuator module. Since this portion of the transmission housing is often closely surrounded by other internal components of the motor vehicle, it is within a very confined space that is difficult and often expensive to access. Furthermore, in order to remove the actuator module mounted of the '476 application from the automatic transmission housing, many other components in close proximity to the installation of the actuator module that block access must first be disconnected and removed before disconnecting and removing the actuator module.

Thus, it would be beneficial to provide a transmission shifting apparatus that includes an actuator module that provides flexibility in that can be mounted in places in a motor vehicle (and vehicles such as water craft) where available space is found. In other words, it would be beneficial to provide a transmission shifting apparatus that does not need to be mounted directly to the automatic transmission housing where space is severely limited and access is difficult. It would also be beneficial to provide such a transmission shifting apparatus that could be installed as part of the manufacture of a new motor vehicle or could be installed as an after-market part.

SUMMARY OF THE INVENTION

These and other objects of this invention are achieved by providing an automatic shift apparatus that is adapted for use with an automatic transmission that is situated within a closely confined area within a vehicle. The transmission is of the type that includes an externally mounted shift position select lever that selectively shifts the transmission from a present transmission shift position to one of a plurality of desired transmission shift positions. The shifting apparatus includes an operator input means adapted to be mounted in the passenger compartment of the vehicle. The operator input means is arranged to respond to actuation by the vehicle operator and generates an operator signal representative of a desired transmission shift position. A motor drive assembly is adapted to be mounted within the vehicle at a location remote from the closely confined area in which the transmission is located. The motor drive assembly is operatively connected to a flexible cable. The flexible cable extends from the remote location and engages the shift position select lever to impart rotational movement thereon. A processor means determines the present transmission shift position and operates in response to receipt of the operator signal to energize the motor drive assembly to induce rotational movement of the shift position select lever to a position corresponding to the desired transmission shift position.

In a variation of the first exemplary embodiment, the flexible cable is sleeved, the flexible cable being moveable within the sleeve.

In another variation of the exemplary embodiment, the motor drive assembly comprises a substantially rigid mounting plate, a motor driven actuator assembly including an output shaft, and means for mounting the motor driven actuator assembly to the mounting plate. The output shaft is operatively connected to a translational member, the driven translational member being operatively connected to the flexible cable.

In another variation of the exemplary embodiment, the axis of the output shaft is substantially parallel to the axis of the driven translational shaft.

In another variation of the exemplary embodiment, the motor driven actuator assembly includes a housing through which the output shaft extends.

In another variation of the exemplary embodiment, the sleeve is affixed to the transmission housing.

In another variation of the exemplary embodiment, the sleeve is affixed to said mounting plate.

DESCRIPTION OF THE DRAWINGS

Other objects and many attendant features of this invention will become readily appreciated as the same becomes better understood by reference to the following detailed description when considered in connection with the accompanying drawings wherein.

DETAILED DESCRIPTION OF THE PREFERRED EMBODIMENTS

Figure 1:
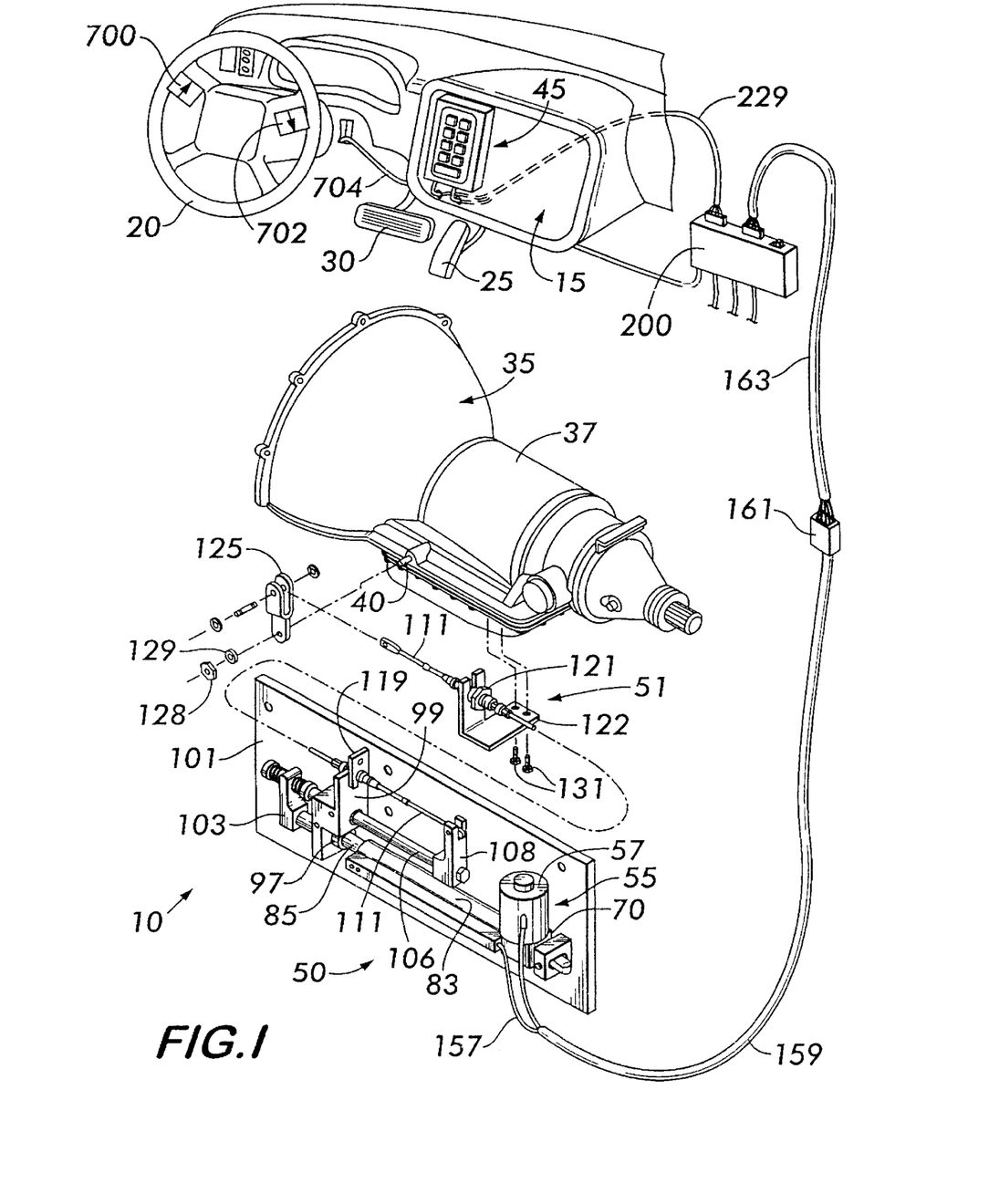
FIG. 1 is an isometric view of selected portions of a motor vehicle to illustrate the manner in which a portion of the shifting apparatus of the present invention is mounted to a motor vehicle transmission.

Referring now in greater detail to the various figures of the drawings wherein like reference numerals refer to like parts there is shown at 10 in FIG. 1 the shifting apparatus of the present invention in association with a motor vehicle of the type having an instrument panel assembly 15, a steering wheel 20, an accelerator pedal assembly 25, a braking mechanism 30 and an automatic transmission assembly 35. The transmission assembly 35 includes a housing 37 and shift position select shaft 40. The shift position select shaft 40 is mounted externally to the transmission housing 37 and is provided for rotational movement. The transmission 35 is operable in a known manner in response to rotation of the shift position select shaft 40 to operate internal devices within the transmission to position the transmission in a plurality of transmission positions such as park, neutral, drive, reverse, etc.

Broadly stated, the shifting apparatus of the present invention includes a key pad module 45, a motor drive module 50 including an actuation component 51 and a controller 200. The motor drive module 50 is adapted to be affixed, e.g., bolted, anywhere within the vehicle, and specifically, may be mounted anywhere it is convenient for the installer. Due to the inclusion of a flexible cable 111 (to be discussed in detail below), mounting of the motor drive module 50 directly to the transmission housing 37 is not necessary. In other words, the inclusion of the flexible cable 111 provides a great deal of flexibility in mounting the motor drive module 50 in situations where mounting directly to the transmission housing 37 is difficult or impractical due to space considerations. Rather than mounting directly to the transmission housing 37, the motor drive module 50 may be installed on other convenient surfaces within the motor vehicle such as a surface in the trunk or under a seat, where space is available and access is easy.

Figure 2:
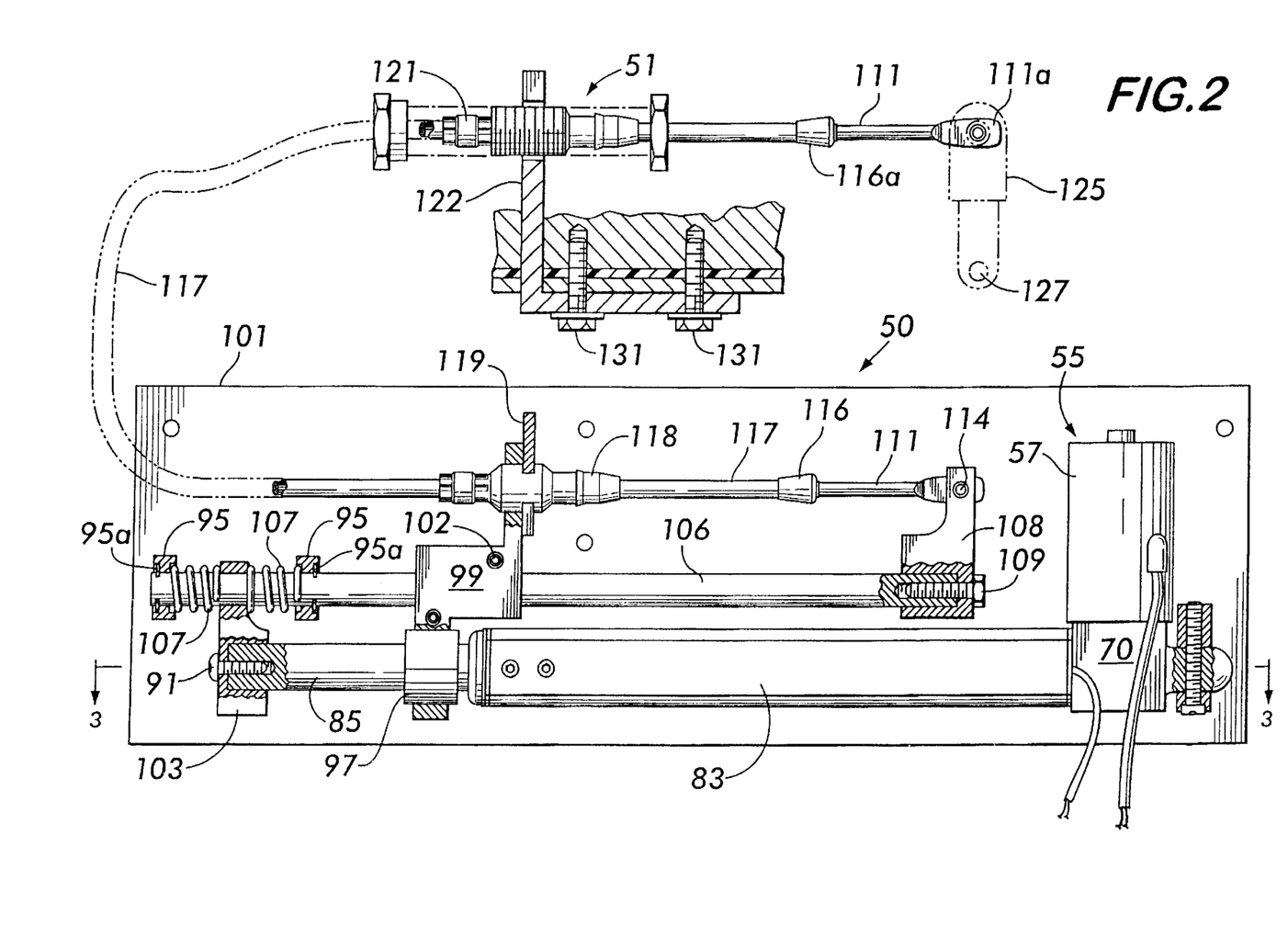
FIG. 2 is an elevational view of the shifting apparatus of the present invention.
Figure 3:
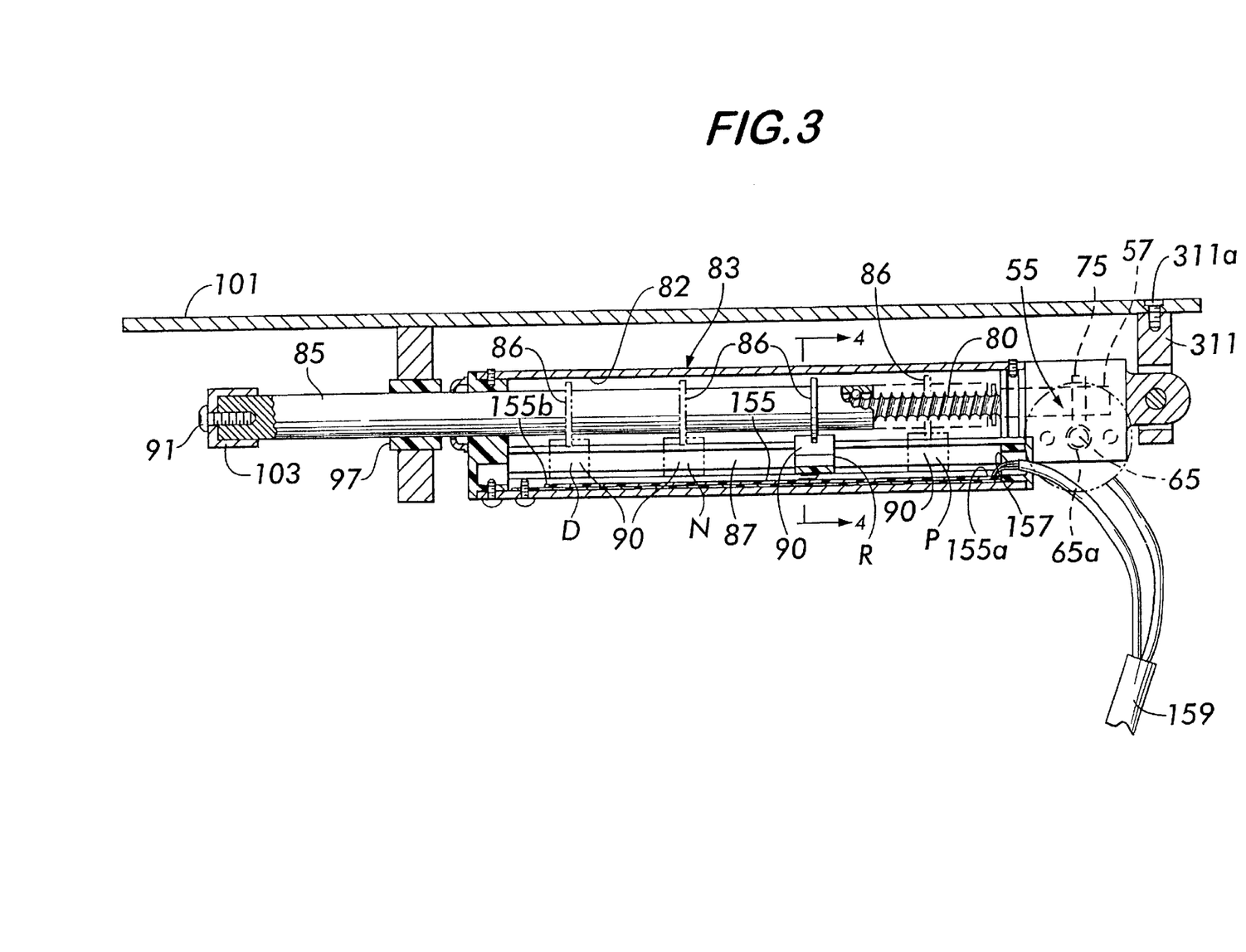
FIG. 3 is an enlarged, sectional view taken along line 3—3 of FIG. 2.

Referring now to FIGS. 1 and 2, the motor drive module 50 includes motor assembly such as a 12 volt DC electric motor 55 disposed within a housing 57. The use of a 12V DC electric motor within the motor drive module 50 is merely exemplary and other types of motors could be utilized within the scope of this invention. The DC motor 55 includes an output shaft 65 (shown in FIG. 2) which extends through the housing 57 and into the internal cavity of a speed reduction housing 70. The shaft 65 includes a threaded free end 65a which acts as a worm wheel. A worm gear 75 positioned within the cavity of the speed reduction housing 70 is driven by the output shaft 65. As best shown in FIG. 3, the worm gear 75 is provided with a central opening and is fixedly secured to a threaded actuator shaft 80 which extends through the central opening of the worm gear 75. Thus, rotation of the worm gear 75 causes rotation of the threaded actuator shaft 80.

Referring again to FIG. 4, substantially the entire length of the threaded actuator shaft 80 extends within a cylindrical opening 82 which forms a portion of an actuator housing 83. The actuator housing 83 also comprises a generally rectangular opening 87 which is in communication with the cylindrical opening 82 by means of a slot 89 that extends the length of the actuator housing 83. Also disposed within the cylindrical opening 82 is an internally threaded output sleeve 85 which, as best shown in FIGS. 3 and 4, is disposed over the externally threaded actuator shaft 80 and is in threaded engagement therewith.

Figure 4:
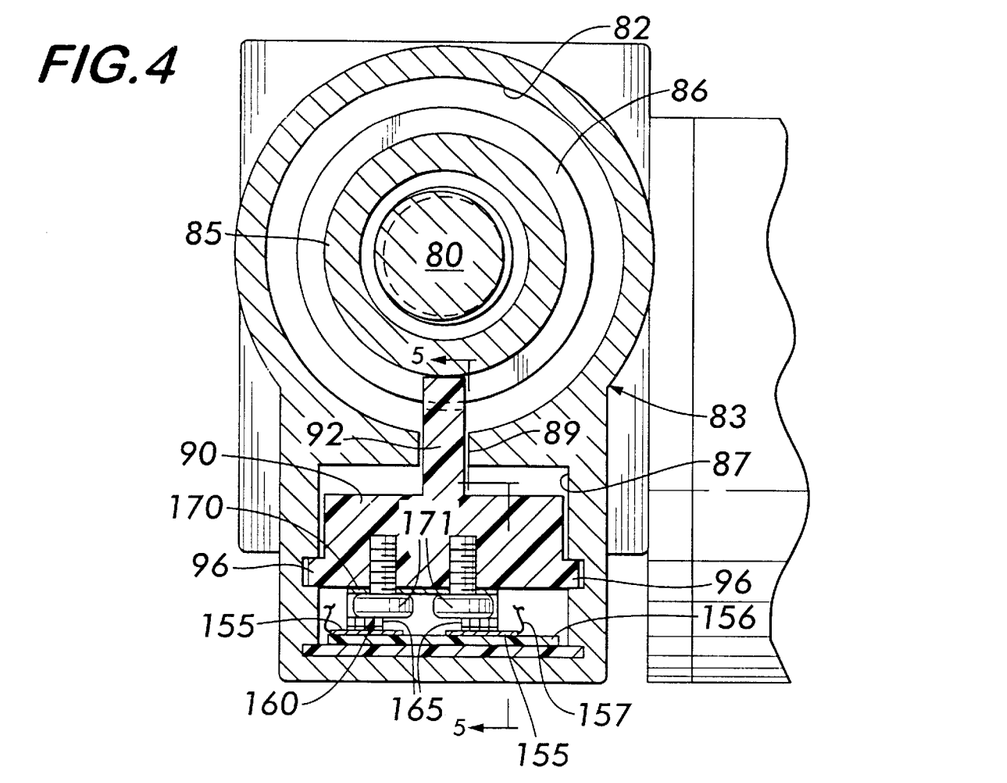
FIG. 4 is an enlarged, sectional view taken along line 4—4 of FIG. 3.
Figure 5:
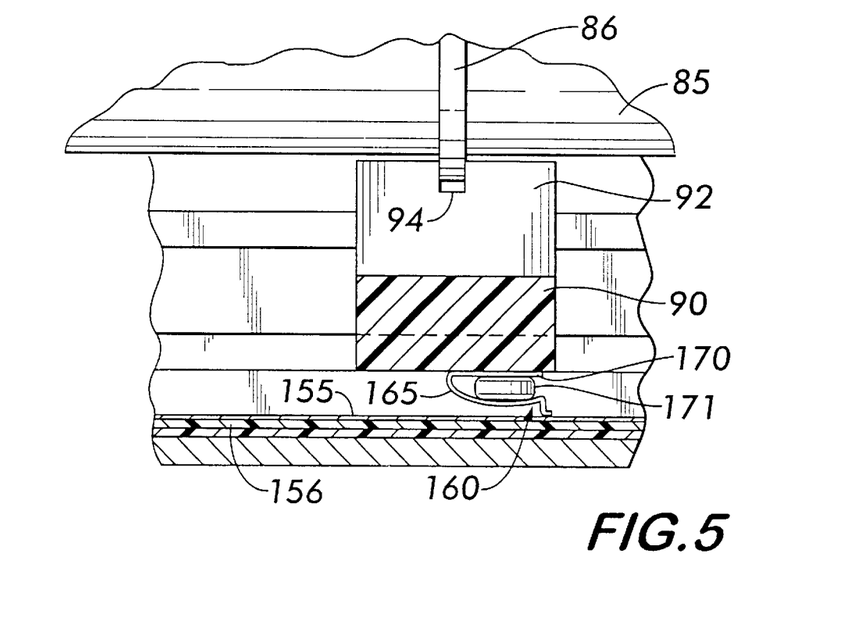
FIG. 5 is an enlarged, sectional view taken along line 5—5 of FIG. 4.

Referring now to FIGS. 3–5, the internally threaded output sleeve 85 includes an upstanding collar 86 which surrounds the output sleeve 85. A slidable element 90 is disposed within the rectangular opening 87 of the actuator housing 83. As best seen in FIG. 4, the slidable element 90 includes a pair of horizontally extending flanges 96, each flange being seated within a slot located on each side wall of the rectangular opening 87 of the actuator housing 83. In this manner, the slots form a track in which the slidable element 90 may freely travel by sliding back and forth over the entire length of the rectangular opening 87. The slidable element 90 also includes a vertical flange 92 which extends upwardly therefrom through the slot 89 in the housing 83. As best shown in FIG. 5, the vertical flange 92 is provided with a slot at 94 in which the upstanding collar 86 of the output sleeve 85 is seated.

Extension of the vertical flange 92 through the slot 89 and its connection to the output sleeve 85 prevents rotational movement of the output sleeve 85. In this manner, rotational movement of the actuator shaft 80 causes the output sleeve 85 to travel linearly within and outside of the housing 83 from a fully retracted position wherein substantially the entire length of the output sleeve 85 is disposed within the housing 83 to a fully extended position wherein a major portion of the output sleeve 85 extends outside of the housing 83.

Referring now to FIG. 2, as the output sleeve 85 extends outwardly from the housing 83, it passes through and is arranged for reciprocating movement through a stationary support sleeve 97. The support sleeve 97 forms a portion of a stationary block 99 that is affixed to a mounting plate 101 by any suitable means, e.g., bolts 102. As best shown in FIG. 3, the actuator housing 83 and 12 volt DC electric motor 55 are also affixed to the mounting plate 101 by a suitable bracket 311 and mounting hardware 311a. At its free end, the moveable output sleeve 85 is connected to a bracket 103 by any suitable fastening means, e.g., a screw 91. At its opposite end, the bracket 103 includes an opening through which a translational member 106 moveably passes. The translational member 106 is contained within the opening of the bracket 103 on both sides by locking washers 95 and springs 107, each locking washer 95 including a captive locking ring 95a disposed therein. In this manner, through bracket 103, linear reciprocating movement of the output sleeve 85 is translated to the translational member 106. The translational member 106 moveably extends through an opening in the stationary block 99 and at its opposite end is joined to a bracket 108 by any suitable means, e.g., a bolt 109. At its opposite end, the bracket 108 includes a bifurcated portion (best seen in FIG. 1) that is joined to the flat end of a cable 111 by any suitable means, e.g., a rivet 114. As the cable 111 extends from the bifurcated portion of the bracket 108, it extends within a collet 116, a sleeve 117, and a ferrule 118 which provide guidance to the cable 111 as it passes through a U-shaped bracket 119 affixed to the stationary block 99. The cable 111 disposed within with sleeve 117 is flexible and able to move freely in forward and reverse directions within the sleeve 117. In other words, the sleeve 117 is not fixedly secured to the cable 111. The cable 111 extends within the sleeve to the actuator component 51. As best shown in FIGS. 1 and 2, the actuator component 51 includes a plurality of collets and related hardware 121 that are mounted to a bracket 122. The collets and related hardware provide guidance to the cable 111 and sleeve 117 as they pass through the bracket 122. Eventually the cable 111 emerges from the sleeve 117 at a collet 116A and engages a yoke assembly that includes a Y-shaped bracket 125 and associated mounting hardware. As best shown in FIGS. 1 and 2, the lower end of the Y-shaped bracket 125 includes an opening 127 sized to fit over the shift position select shaft 40 and is attached to the shift position select shaft 40 by any suitable mounting hardware, e.g., nut 128 and washer 129. The cable 111 includes a flattened end 111a that is arranged for attachment to the upper end of the Y-shaped bracket 125 by use of any suitable mounting hardware as best shown in FIG. 1.

Thus, as best demonstrated in FIGS. 1 and 2, travel of the output sleeve 85 to predetermined positions between the retracted position and the extended position causes movement of the translational member 106 through the common attachment of these two elements to the bracket 103. Likewise, movement of the translational member 106 along its axis causes movement of the first end of the cable 111 within the sleeve 117 through common attachment of these two elements to the bracket 108. Movement of the cable 111 within the sleeve 117 imparts rotational movement upon the shift position select shaft 40 as a result of the cable's attachment to the Y-shaped bracket 125 which engages the shaft 40. Rotational movement of the shift position select shaft 40 in predetermined amounts causes shifting of the transmission in known ways among the plurality of transmission shift positions, e.g., park, neutral, drive, reverse, etc.

Under the preferred exemplary embodiment shown in FIG. 1, the actuator component 51 is shown mounted directly to the transmission housing 37 by means of any suitable hardware, e.g., bolts 131 passing through openings in the bracket 122. However, it should be understood that it is within the scope of this invention that the actuator component 51 could be mounted to other more convenient surfaces in proximity to the transmission housing 37 such as the frame of the vehicle, or a firewall, so long as the actuator component 51 is oriented in a manner that causes rotation of the shift position select shaft 40. Being able to mount the actuator component 51 to convenient surfaces within the vehicle other than the transmission housing 37 provides a degree of mounting flexibility that is not offered by the automatic transmission shifting devices of the prior art.

As can be seen from the above disclosure, due to the inclusion of the flexible cable 111, mounting of the motor drive module 50 directly to the transmission housing 37 is not necessary. In other words, the inclusion of the flexible cable 111 provides a great deal of flexibility in mounting the motor drive module 50 in situations where mounting directly to the transmission housing 37 is difficult or impractical due to space considerations. Rather than mounting directly to the transmission housing 37, the motor drive module 50 may be installed on other convenient surfaces within the motor vehicle such as a surface in the trunk or under a seat, where space is available and access is easy. Having this flexibility is desirable because it enables mounting of the motor drive module 50 away from the transmission housing 37 where space is at a premium and access is difficult. A more convenient location having adequate space facilitates access to the several electrical and mechanical components that comprise the motor drive module 50 thus facilitating removal and/or repair. Due to the relatively small size of the actuator component 51, it is a relatively easy matter to mount the actuator component 51 in close proximity to or directly to the transmission housing 37 where access is difficult and space is limited.

As best shown in FIGS. 4 and 5, the motor drive module 50 further includes a variable resistance circuit assembly housed within the rectangular opening 87 of the housing 83. The assembly includes a pair of conductive strips 155 disposed on the bottom wall of the rectangular opening 87. The conductive strips 155 are straight and substantially parallel and therefore are electrically isolated from one another. Referring now to FIG. 3, the strips 155 extend substantially the entire length of the housing 83 and include a near end indicated at 155a and a far end indicated at 155b. Referring again to FIGS. 4 and 5, a bridge assembly 160 mounted to the slidable element 90 serves as an electrical bridge between the strips 155 thus bringing them into electrical contact. The strips 155 may be formed of any suitable electrically conductive material, e.g., copper, and are attached to a non-conductive base strip 156 which is in turn attached to the bottom wall of the rectangular opening 87. The bridge assembly 160 includes a pair of flexible electrically conductive brushes 165 that are secured to the slidable element 90 by any suitable means, e.g., bolts 171. Importantly, the conductive brushes 165 are connected together by a conductive element 170 extending therebetween that is integral with the brushes 165. Each brush 165 is in electrical contact with one of the strips 155. The bridge assembly 160 is arranged for movement beneath the entire length of the strips 155 with the brushes 165 remaining in electrical contact with the strips 155 at all times.

As best shown in FIGS. 3 and 4, leads 157 are attached at the near end of the strips at 155a. The leads 157 extend into a cable assembly 159 which terminates in a pin type plug 161 (FIG. 1). A second cable assembly 163 extends from the pin type plug 161 to a controller assembly 200 in which a potentiometer (not shown) is disposed, the potentiometer measuring resistance over a predetermined range, e.g., between 0 and 9000 ohms. Referring now to FIGS. 3 and 4, the potentiometer is provided to measure resistance over a portion of the strips 155 between the near end 155a and the bridge created by the bridging assembly 160. As best shown in FIG. 3, when the output sleeve 85 is moved to the fully retracted position (as described previously), the transmission is shifted to park and the bridging assembly 160, disposed on the slidable element 90, is located at position P, corresponding to park. It should be understood that positioning of the output sleeve 85 in the fully retracted position to cause shifting to park is a matter of design choice and positioning the output sleeve 85 at positions other than the fully retracted position may be selected to cause shifting to park. When positioned at P, the portion of the strips 155 located between the near end 155a and the bridge formed by the bridging assembly 160 is relatively small and the resistance detected by the potentiometer over this portion is a relatively small amount, e.g., 750 ohms.

When the output sleeve 85 is moved in the manner previously described from the fully retracted position corresponding to park to the first predetermined position corresponding to reverse, the slidable element 90 is moved from position P to position R, corresponding to reverse, thus increasing the length being measured between the near end 155a and the bridge formed by the bridging assembly 160. As the length between the near end 155a and the bridging assembly 160 increases, the amount of resistance measured by the potentiometer between these two points also increases, e.g., 1720 ohms. Thus, the resistance measured with slidable element 90 at position R is greater than that measured with the slidable element 90 positioned at P. Likewise, as the slidable element 90 is moved from position R to position N (corresponding to neutral) the amount of resistance measured by the potentiometer again increases, e.g., 2700 ohms. Finally, as the slidable element is moved from position N to position D (corresponding to drive) the amount of resistance measured by the potentiometer again increases, e.g., 3675 ohms, since the distance between the near end 155a and the bridging assembly 160 again increases. The slidable element 90 may be moved to additional positions corresponding with low 2 and low 1 (not shown). The potentiometer will measure different values associated with these positions, e.g., 4650 and 5625 ohms, respectively. In this manner, since the potentiometer will measure different resistance values for the different positions of the slidable element 90 over the strips 155, different potentiometer values may be associated with each of the locations of the slidable member 90 which represents each of the various transmission shift positions, i.e., park, reverse, neutral, drive, low 2 and low 1. Thus, as will be described later in this application, different potentiometer values may be assigned to the various transmission positions and stored in memory for later recall for shifting to a particular transmission position.

At this juncture, it is important to mention that disclosure provided herein describing the manner in which the shifting apparatus 10 of the present invention operates to shift an automatic transmission from a present transmission shift position to a desired transmission position by measuring the resistance of the variable resistance circuit as it changes in length, is merely exemplary and is not intended to limit the scope of this invention in any way. To the contrary, other methods for determining the present transmission shift position and shifting therefrom to a desired transmission shift position are contemplated and are considered within the scope of this invention although not disclosed herein.

Figures 6A, 6B:
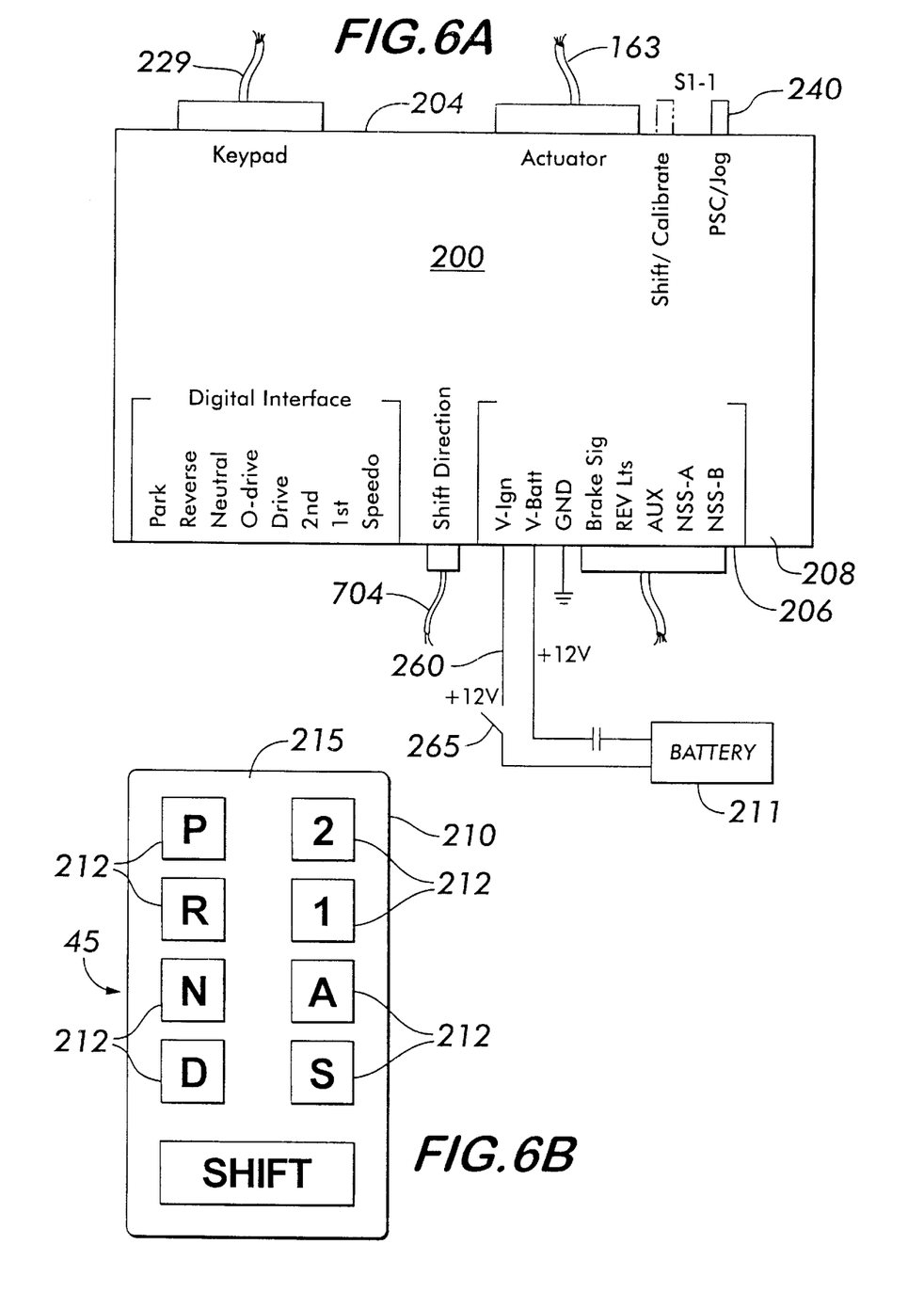
FIG. 6A is a top view of the controller used with the shifting apparatus of the present invention.
FIG. 6B is a front view of the key pad used with the present invention.

Referring now to FIG. 1 the key pad module 45 is intended for ready installation at a convenient location within the passenger compartment of the motor vehicle such as an opening within the instrument panel assembly 15 by insertion and fastening therein utilizing suitable hardware. The key pad module may be of any suitable material. Alternatively, the key pad module 45 may be laid on the vehicle seat or installed on an overhead console or headliner mounted to interior ceiling above and between the seats. One particularly effective key pad module 45 is manufactured by the Staco Company. Referring now to FIG. 6B, in the embodiment illustrated, the key pad module 45 includes a housing 210 of general box-like configuration which encloses a plurality of keys 212, e.g., nine individual keys, positioned on the front face 215 of the housing 210. The keys 212 can take many forms, for example, the keys 212 can be mechanical switches or can be touch-sensitive or pressure-sensitive contact areas of a larger single panel. In the embodiment illustrated several of the keys 212 are designated to correspond to the available transmission shift positions. That is, "P" corresponds to the park position, "R" corresponds with the reverse position, "N" corresponds with the neutral position, "D" corresponds with the drive position, "2" corresponding with the low 2 drive position, and "1" corresponding with the low 1 drive position. There is also provided a key designated "Shift" which is a safety feature to be explained below.

In a Shift mode, to be discussed below, these keys are utilized for shifting the automatic transmission during operation of the motor vehicle. Specifically, by depressing a key corresponding to a desired transmission position, e.g., drive, while in Shift mode, the apparatus 10 will retrieve a potentiometer value from memory associated with that desired shift position and will operate the motor drive module 50 to move the shift position select shaft 40 until the desired transmission position has been reached. The "S" key corresponds with a Security Override feature to be explained fully below. "A" is an auxiliary key for providing power to an accessory, e.g., an additional passenger compartment lamp, add-on gages, etc. In two different security modes to be discussed below, all of the keys 212 are utilized to form possible access codes. The keys are also utilized in Jog and Calibrate modes which are utilized by factory personnel during installation of the shifting apparatus 10 to the motor vehicle transmission.

A display device such as a LCD or LED display is associated with each of the keys 212 and is provided to indicate the operating state of the key. For example, depending upon the mode in which the apparatus is set, an intermittently flashing display lamp may indicate that the apparatus is monitoring the key pad for a key press while a continuously illuminated lamp may indicate that the system has detected a key press. Intermittently flashing display lamps are also utilized under this invention to provide the driver with notification of possible hazardous operating conditions. The illumination scheme described herein is exemplary only and is not intended to limit the invention in any way. Other schemes for illuminating display lamps 212 based upon operating mode could be employed without departing from the scope of this invention. Further, the controller 200 controls operation of an audible alarm mounted external from the controller, the audible alarm being arranged to emit either a continuous or an intermittent beep pattern to provide notification to the vehicle driver when certain operating conditions exist. The audible alarm described herein is exemplary only and is not intended to limit the invention in any way. Other schemes for audibly alarming the system 10 of the present invention could be employed without departing from the scope of this invention.

Referring again to FIG. 1, the key pad module 45 is in communication with the controller assembly 200 by means of a signal cable 229 extending therebetween. The keys 212 coact in known ways with a printed circuit board (not shown) located within the controller 200 to generate suitable electrical signals in response to respective depressions of the keys 212.

The controller 200 includes a central processing unit (CPU), preferably a programmable microprocessor (not shown) having software recorded therein. The CPU is mounted to the printed circuit board (not shown). The controller 200 also includes other electronic components, e.g., capacitors, fail/safe relays, fuses, resistors, switches, diodes, etc., mounted to the printed circuit board and connected to the CPU through the circuit board. The CPU is also provided with permanent or non-volatile memory that retains data stored therein even when power to the memory device is shut off, e.g., an EEPROM. The controller receives signals from the key pad module 45, the variable resistance circuit assembly of the motor drive module 50, the vehicle braking mechanism 30. Referring now to FIG. 6A, ports are provided on a side 204 of the controller to enable connection of the controller 200 to the key pad module 45 through cable 229 and to the motor drive module 50 through cable assembly 163. The controller includes a face plate 208 bearing the designations "Actuator" and "Key Pad" in locations corresponding to the location of these ports. Further, a multi-socket terminal block 206 is provided on the opposite side of the controller 200 which enables a plurality of connections between the controller 200 and several vehicle components, i.e., power source (battery) 211, ground, braking mechanism, reverse lights, vehicle neutral safety switches and auxiliary components. These connections are designated on the controller face plate 208 as "V-Batt" and "V-Ign" for connection with a power source, e.g., the vehicle battery 211, "REV Lts" for connection with vehicle reverse lights, "Brake Sig" for connection with the vehicle braking mechanism 30, "GND" for connection to ground, "AUX" for connection to auxiliary accessories such as an additional passenger compartment lamp and "NSS-A" and "NSS-B" for connection as neutral safety switches.

As shown in FIG. 6A, the vehicle utilizes an ignition switch 265 which is operable to provide switched battery voltage (12V) via the power line 260. The ignition switch 265 is preferably a known vehicle ignition switch having "off", "on" and "crank" positions. As is known in the art, the ignition switch 265 may be switched from the "off" position to the "on" position to thereby connect the controller 200 to the vehicle battery 211 via the power line 260. The ignition switch 265 may further be temporarily switched from the "on" position to the "crank" position to thereby start the engine. Once the engine is started, the ignition switch 265 typically returns automatically to the "on" position. The ignition switch 265 may be switched from the "on" position to the "off" position to thereby shut down the engine.

A switch 240 is located on the side of the controller 200 which is labeled S1-1. During calibration of the shifting apparatus 10 by factory personnel, the switch 240 is arranged to be toggled between the Jog and Calibrate modes. These modes are each indicated behind a slash "/" appearing in a designation on the face plate 208 of the controller 200. Once the shifting apparatus has been installed to the transmission housing, during normal operation, the switch 240 is arranged to be toggled between Program Security Code (PSC) mode and Shift mode. These modes are indicated before the slash "/" appearing in the same designation on the face plate 208 of the controller 200.

Using software stored in the memory, the controller 200 receives input codes from the key pad module 45, the vehicle braking mechanism 30, the variable resistance circuit assembly of the motor drive module to provide suitable control signals for shifting of the automatic transmission, operation of the vehicle security system and other functions. The software may be written utilizing any suitable programming language, e.g., assembler language.

Figure 7A:
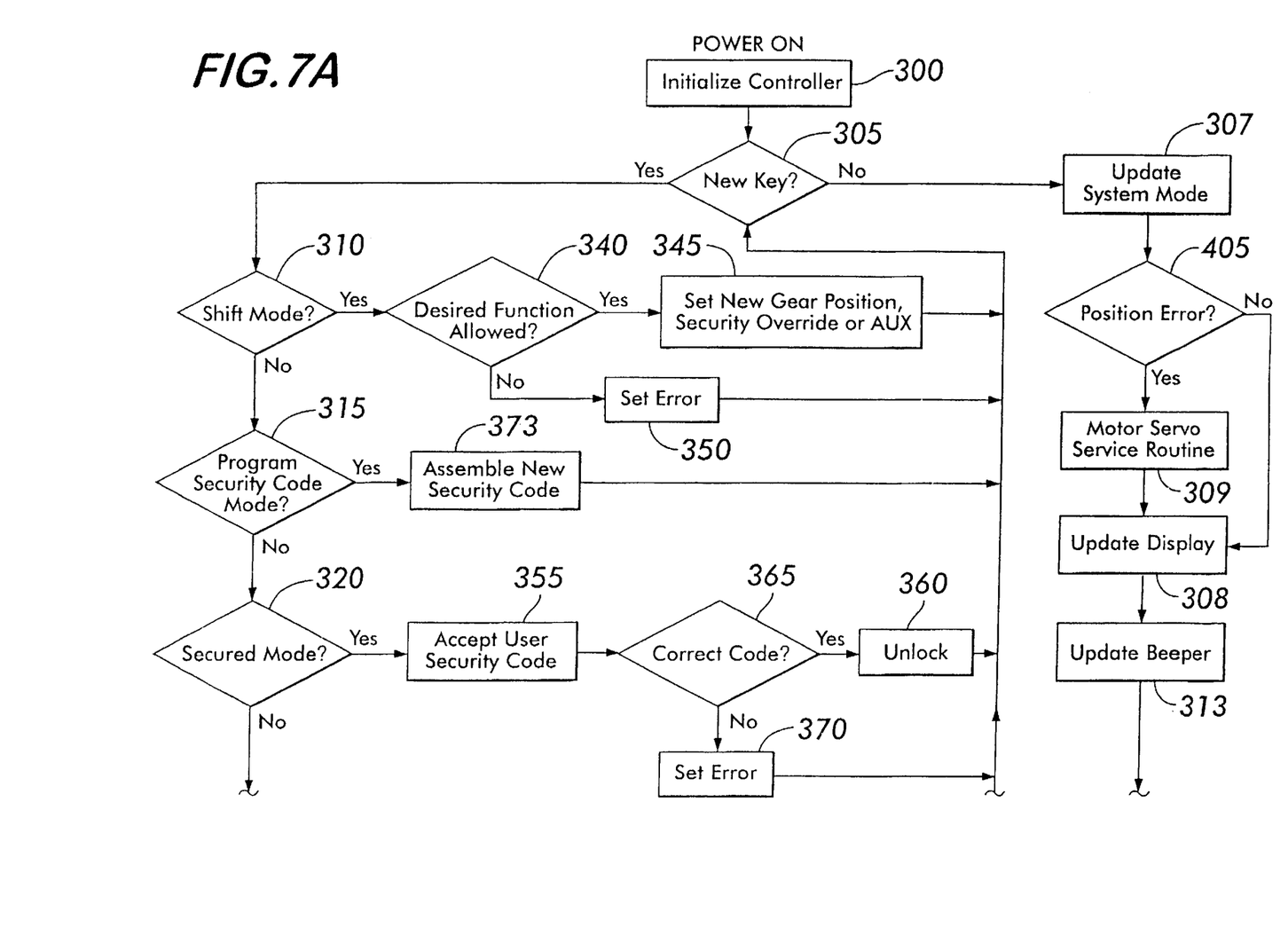
FIG. 7A is a flowchart diagram illustrating the operation of the present invention; and, FIG. 7B is a continuation of the flowchart diagram set forth in FIG. 7A.
Figure 7B:
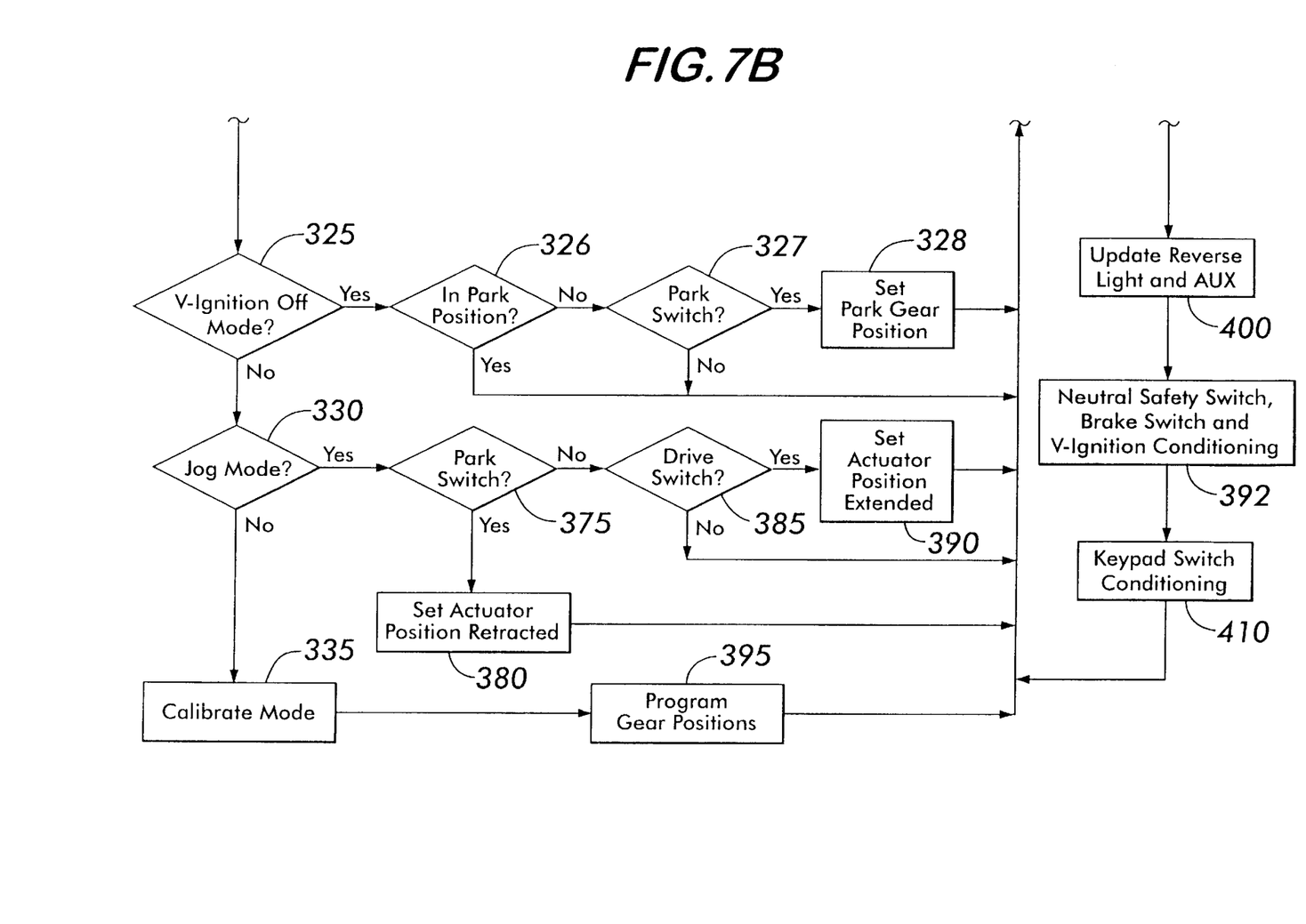

Referring now to FIGS. 7A and 7B, a flowchart is provided illustrating various modes of operation of the shifting apparatus 10 of the present invention. These modes of operation include Shift mode, Program Security Code (PSC) mode, Secured mode, V-Ignition Off mode, Jog mode and Calibrate mode. The first four of these aforementioned modes are utilized by the driver before and during normal operation of the vehicle and will be explained in detail below. The remaining two of these six modes, i.e., the Jog mode and the Calibrate mode, are used only by factory personnel during calibration of the shifting apparatus 10 to the automatic transmission 35. Factory personnel utilize these two modes for programming each of the keys 212 with potentiometer values associated with the various shift positions, so that during normal operation in Shift mode, when a key 212 is depressed by a driver, the shifting apparatus 10 will cause the transmission 35 to shift to the shift position corresponding with the key 212 depressed.

The operation of the controller will now be described in detail. Referring now to operation block 300 in FIG. 7A and referring to FIG. 6A, as previously mentioned, the ignition switch 265 may be switched from the "off" position to the "on" position thereby providing ignition voltage from the vehicle battery 211 to the controller 200 via the power line 260. Upon receipt of ignition voltage, the controller 200 initializes itself for operation. During initialization, several housekeeping tasks are performed for the microprocessor that are specific to the type of microprocessor being employed. These tasks include retrieval of position values assigned to the keys 212 for use in Shift mode, resetting of all controller inputs, outputs and registers, resetting of all delay timers to zero, turning off all display lamps, and checking the last known security status. Also, during initialization, internal RAM memory is initialized. Also, during initialization, LED's, start timers and analog to digital converters are initialized.

Next, as shown in FIG. 7A, the software flows down to decision block 305 wherein the controller 200 monitors the key pad module 45 for a key 212 to become active, i.e., depressed. Under the subroutine, once a scanned key becomes active, i.e., depressed, the subroutine stores the key's value and location within the RAM memory of the controller 200 for use by other subroutines of the software to be discussed in detail below. Also, under the key pad scan subroutine, a debounce timer is utilized for timing the duration of a key press to distinguish a genuine key press from noise in the system. Other methods for debouncing key press signals known to those skilled in the art may be employed and are within the scope of the present invention.

If the controller determines that a key 212 has become depressed, the program flows to one of the six modes of operation mentioned previously, i.e., Shift mode 310, Program Security Code (PSC) mode 315, Secured mode 320, V-Ignition Off mode 325, Jog mode 330 and Calibrate mode 335.

Operation block 307 determines which of the six modes of operation is selected. Under this operation block, various status flags and switches throughout the software are checked. The subroutine of this operation block prioritizes these inputs, determines which mode the shifting apparatus 10 should be operating in and sets other status flags indicating the present operating mode. For example, under the operation block 307, the software ascertains whether this is the first time power (FTP) is being provided to the apparatus 10, such as at the factory during calibration. If power is being provided for the first time, the S1-1 switch 240 (FIG. 6A) located on the side of the controller 200 is arranged to toggle between Jog mode or Calibrate mode. When toggled to Jog mode, a subroutine under the operation block 307 sets the system mode to Jog mode. Likewise, when toggled to Calibrate mode, the subroutine under the operation block 307 sets the system mode to Calibrate mode. Parenthetically, if first time power is not being provided, the S1-1 switch 240 is arranged to toggle between Shift mode and PSC mode. These modes, to be discussed below, are also set by operation block 307 based upon the position of the S1-1 switch 240 after first time power is provided.

As previously mentioned, during normal operation, the S1-1 switch, indicated at 240 in FIG. 6A, must be toggled toward Shift mode (and away from Program Security Code (PSC) mode) in order for the software to operate in the Shift mode. Under operation block 308, when in Shift mode, all of the keys 212, i.e., "P", "R", "N", "D", "2" or "1", "S.O." and "AUX", are set to active status for the setting of new transmission gear positions. Referring now to operation block 345, upon depression of any of the keys corresponding to a desired transmission shift position, i.e., "P", "R", "N", "D", "2" or "1", the software 203 retrieves from memory a potentiometer value associated with a desired transmission position and stores that value in a motor destination register. The software also sets a speed for the electric motor 55 to operate. A motor control subroutine within the software (indicated at operation block 309) compares the retrieved potentiometer value (representing a desired transmission position) with the potentiometer value associated with the present position of the slidable member 90 to ascertain whether the shift position select lever 40 has been moved to the desired transmission shift position. Potentiometer values associated with desired transmission positions are retrieved from a motor destination register. The manner for storing these potentiometer values will be discussed in detail below.

If the potentiometer value associated with the present position of the slidable member 90 is not within the tolerance range of the potentiometer value associated with the desired transmission position, the subroutine ascertains whether the desired transmission shift position potentiometer value is greater than or less than the potentiometer value associated with the present position of the slidable member 90. Based upon this determination, as indicated at operation block 309, the subroutine then causes the electric motor 55 to run either in the forward or reverse directions to move the slidable member 90 to cause the potentiometer value associated with the present position of the slidable member 90 to come within a tolerance range of the potentiometer value associated with the desired transmission position. The subroutine set forth in operation block 309 loops back onto itself until it ascertains that the electric motor 55 has caused the slidable element 90 to travel to a potentiometer value within the tolerance range associated with the desired transmission shift position. Once the potentiometer value falls within the range of the stored potentiometer value range, the electric motor 55 is shut off. Upon ascertaining the current value to be within the tolerance of one of the stored potentiometer values, the subroutine turns on the display lamp 212 associated with the corresponding transmission shift position and turns off all remaining display lamps. The updating of display lamps is controlled at operation block 308. Thereafter, the software returns to decision block 305 and awaits the depression of another key corresponding to a desired transmission shift position.

Referring again to FIG. 1, the shift position select shaft 40 is external to the transmission housing 37, however includes a follower (not shown) that extends within the transmission housing 37 where it engages with a rooster tail control member (not shown) of known form. The rooster tail control member comprises a plurality of valleys, each valley corresponding with a different gear position of the automatic transmission 35. Each time a new gear is selected, it is essential that the follower of the shift position select shaft 40 falls within the precise dead center of the valley of the rooster tail corresponding to the desired gear. The exact location of the precise dead center of the rooster tail valley varies slightly from vehicle to vehicle, and also may vary from locations specified by vehicle manufacturers. As a result, potentiometer values associated with desired transmission positions, which may be based upon slightly inaccurate manufacturers specifications, may send the follower to positions within the rooster tail valley that are slightly off the precise dead center of the valley corresponding to a desired gear. As a consequence, to assure that the follower comes to rest in the dead center of the valley, the translational member 106 is positioned between springs 107. The springs 107 enable the translational member 106 to provide any "give" that may be necessary to enable the follower to find the dead center of the valley.

As mentioned previously, the key pad 45 is also provided with a key 212 designated as "Shift." While in Shift mode, after any of the keys "P", "R", "N", "D", "2" or "1" has been actuated, as a safety precaution, it is necessary for the driver to additionally depress the key 212 designated "Shift" in order to cause the electric motor 55 to run either in the forward or reverse directions to move the slidable member 90. For example, if the current transmission state is Park and the driver wishes to shift from Park to Reverse, the driver would first have to actuate the key 212 designated as "R" and thereafter actuate the key 212 designated as "Shift." In this manner, any unintended actuation of the keys "P", "R", "N", "D", "2" or "1" without actuating the "Shift" key will not result in shifting of the transmission 35.

Also, under Shift mode, the vehicle driver has the ability to provide power to accessory components such as an additional passenger compartment lamp by depressing the key designated "A" while in Shift mode. As best shown in FIG. 6B, upon depression of the key designated "A", the software provides power to an accessory component, such as a lamp inside the passenger compartment of the vehicle.

Referring now to decision block 340, the software will not permit shifting unless certain safety conditions are satisfied. For example, the software will not permit a shift into reverse or drive unless the brake 30 has been depressed. The system monitors actuation of the brake pedal at operation block 392. Referring now to operation block 345, under such circumstances, the subroutine will activate an audible alarm to emit a predetermined beep tone, e.g., three beeps, notifying the vehicle driver that an invalid key value has been inputted. The updating of audible annunciators is controlled at operation block 313. Thereafter, the software returns to decision block 305 and awaits the depression of another key corresponding to a desired transmission shift position.

Referring now to decision block 405, the software ascertains whether the shifting apparatus 10 is in error mode. For example, the controller 200 could place the system into error mode in the event of a malfunction within the actuator module 50 that would impede travel of the slidable element 90. Under this subroutine, the controller 200 reads the potentiometer housed within the controller 200 over predetermined time intervals and determines how far the slidable member 90 has traveled. If the slidable element 90 has not traveled the amount of distance expected by the software within the time interval, under operation block 360, the controller 200 stops operation of the DC electric motor 55, sets the mode to error mode and sets the display lamps to flash a warning to the driver. For example, the display lamps associated with the top four keys 212 on the key pad 45 may be set to flashing alternately with the display lamps associated with the bottom four keys 212. Additionally, the software 203 sets the audible alarm (not shown) to emit a beep pattern, e.g., a continuous tone. These signals notify the driver that an error has occurred somewhere within the actuator module 50. The shifting apparatus 10 remains in error mode until a repair has been completed.

Referring now to decision block 320, under normal circumstances, the software 203 is set in a Security mode upon vehicle start up, i.e., when the ignition switch 265 is turned to the "on" position and voltage is provided from the battery to the controller 200. Placement of the software into the Security mode upon vehicle start up is controlled by operation block 307. When in Security mode, unless a user code is entered that matches either previously stored factory identification code or a PSC personal identification code (to be explained in detail below), any attempt at starting the vehicle is prevented. A factory identification code is stored in the CPU's permanent memory by factory personnel during installation of the shifting apparatus. The factory identification code may be provided to the purchaser on a laminated card packaged with the shifting apparatus. A PSC personal identification code is programmed by the driver who has already entered a valid factory identification code.

In Security mode, the software sets the display lamps associated with the keys 212 to flashing to provide notification to the driver that the software 203 is monitoring the key pad 45 for entry of a valid user code. Setting of these display lamps is controlled by operation block 308. As shown in operation blocks 355 and 360, and in decision block 365, the Security subroutine monitors the key pad 45 for entry of a user code corresponding with a factory identification code or PSC personal identification code of any number of digits, e.g., four digits. Once a valid user code is entered, the shifting apparatus 10 becomes "unlocked" to enable starting of the vehicle engine and operation in Shift mode. As set forth at operation block 370, if an incorrect user code is entered, the subroutine loops back onto itself until the correct sequence of key values comprising the factory identification code or PSC personal identification code has been entered. Each time the vehicle is restarted, the system will return to the Secured mode until a correct user code has been entered. Once the driver enters a user code that matches an identification code previously stored in memory, the shifting apparatus is unlocked from Security mode.

It is to be understood that while one preferred device for providing the user code signal is the key pad 45, the present invention contemplates that other known devices and/or subsystems may be used to enter the user code information. For example, the key pad 45 may be replaced with a proximity or other card reader operable to read information provided on a magnetic strip of an access card, a memory disk reading device, voice recognition system or other known information transfer device/system.

Once a driver has entered a valid identification code, during operation in Shift mode, the driver has the ability to override operating in the Security mode by simply depressing the key designated "S" on the key pad 45 and holding the key down for a predetermined interval of time, e.g., three seconds. While in Security Override mode, it is unnecessary for the driver to reenter a valid identification code each subsequent time he or she restarts the car by turning the ignition switch 265 to the "crank" position. In other words, when in Security Override mode, the software will set to the Shift mode and enable the driver to turn the ignition switch 265 to "crank" and enable operation in the Shift mode without entry of a identification code. For example, if the driver leaves his vehicle in a garage each night after use where he or she feels it is safe from theft, by utilizing the Security Override mode, the driver avoids having to reenter an identification code each morning to start the vehicle. Likewise, the Security Override mode may be deactivated by simply depressing the "S" key and holding it down for a predetermined interval of time, e.g., three seconds. Once returned to the Security mode, the driver must enter a valid identification code to turn the ignition switch to "crank" and enable operation in the Shift mode.

Also, while in the Shift mode, the software provides the driver with the ability to re-activate Security mode while in park with the vehicle running. For example, during cold winter months, the driver may wish to exit the vehicle while in park to perform a task of short duration, e.g., visit a supermarket, and may wish to keep the engine running to maintain warmth within the vehicle. Under the invention, the driver may place the car in park by depressing the "P" key 212 once. Once in park, the driver may again depress the "P" key 212 for a predetermined interval of time, e.g., three seconds, to leave the Shift mode and reenter the Security mode. Once in Security mode, return to the Shift mode to shift out of park requires entry of a valid identification code. Thus, through operation of this mode, theft of the vehicle while running in park is prevented.

As mentioned previously, the S1-1 switch 240 is arranged to toggle between Shift mode and PSC mode. If the S1-1 switch is not toggled to the Shift mode, operation block 307 sets the shifting apparatus 10 to the Program Security Code mode and the software flows to decision block 315 wherein the display lamps are set to flash in a predetermined pattern. For example, the display lamps associated with the left column of keys 212 on the key pad 45 flash intermittently and the display lamps associated with the right column of keys 212 on the key pad 45 are turned off. The display are controlled by operation block 308. As best shown in operation blocks 373, in the Program Security Code (PSC) mode, the vehicle driver is permitted to program the shifting apparatus 10 to recognize a second identification code in addition to the factory identification code. The second identification code, or PSC personal identification code, is a secondary identification code in addition to the factory identification code that is chosen by the vehicle driver. Thus, once the apparatus 10 is programmed to recognize the driver chosen PSC personal identification, upon entry of a user code corresponding to either the factory identification code or the PSC personal identification code, the software will enable vehicle operation. Any number or type of key values may be utilized in forming the PSC personal identification code. With the PSC personal identification code now programmed, the vehicle driver may start the vehicle and operate in the Shift mode by entering a user code corresponding to either the factory identification code or the driver programmed PSC personal identification code. Once the personal identification code has been programmed, the software returns to decision block 305 and awaits the depression of another key.

Referring now to decision block 325, the software monitors whether the ignition switch 265 has been turned from the "on" position to the "off" position during operation of the vehicle in a transmission position other than park. If the ignition switch 265 has been turned off under these circumstances, by operation block 307, the system switches the operating mode to the V-Ign Off mode wherein the shifting apparatus 10 continues to provide power to the controller 200 for a predetermined period of time, set by a shut down timer, to provide the driver with time to depress the "P" key in order to place the transmission in park. During this predetermined time period, certain display lamps associated with keys 212 in the key pad 45 are set to flash in an alternating pattern to alert the driver that an ignition off condition has been detected during vehicle operation in a transmission shift position other than park. Updating of these display lamps is controlled in operation block 308. Additionally, a beep notification, controlled by operation block 313, could be sent from the audible alarm located within the key pad 45 alerting the driver of this condition, i.e., that the driver has shut off the ignition switch 265 while the vehicle is in gear. As shown in decision blocks 326 and 327 and in operation block 328, if during that time interval, the driver depresses the "P" key, the controller 200 moves the actuator to park and shuts itself off.

Under certain circumstances, such as where the vehicle is traveling at considerable rate of speed, alerting the driver that the ignition has been shut off could prevent a serious accident. Under other circumstances, it may be necessary for the driver to place the vehicle in neutral with the ignition switch 265 off such as for towing purposes. Under these circumstances, shutting down the controller 200 prevents draining of the battery. In other words, upon determining that a predetermined time interval, e.g., one minute, has been reached, if the ignition switch 265 is still off during vehicle operation in a transmission shift position other than park, such as for towing purposes, the shifting apparatus 10 shuts itself down to prevent battery drainage. Under these circumstances, the controller 200 cannot be utilized for placing the vehicle into park until the after ignition has been switched from the "off" position to the "on" position.

Referring again to FIG. 6A, if the switch 240 is toggled to the Jog position, and first time power is being provided, operation block 307 will direct the software to decision block 330 which sets the controller 200 to run in the Jog mode. In the Jog mode, the shifting apparatus 10 enables factory personnel to manually control movement of the motor drive module by alternately depressing the keys 212 designated "P" and "D". Manual movement in the Jog mode is necessary for programming of the keys 212 with the various desired transmission shift positions. Once in the Jog mode, the display lamps associated with the "P" and "D" keys on the keypad module 45 flash intermittently while the display lamps associated with the remaining keys 212 are turned off, thus notifying the driver that only the "P" and "D" key values are enabled in the Jog mode. These display lamps are updated by operation block 308. In other words, in the Jog mode, the software 203 will not recognize the depression of any of the remaining keys values, i.e., "R", "N", "2", "1", "S.O.", "AUX.".

When in the Jog mode, the DC electric motor 55 disposed within a housing 57 is set to run at fifty percent its normal operating speed. Referring now to decision block 375 and operation block 380, by depressing and holding down the "P" key, factory personnel are able to drive the DC electric motor 55 thus causing clockwise rotation of the shift position select shaft 40 of the transmission 35. This also causes the slidable member 90 to move towards the fully retracted position corresponding to park thus changing the amount of resistance over the variable resistance circuit assembly (see FIG. 3). Referring now to decision block 385 and operation block 390, likewise, by depressing the "D" key, factory personnel are able to drive the motor 55 in the opposite direction thus causing counterclockwise movement of the shift position select lever 40 thus causing movement of the slidable member 90 towards the fully extended position corresponding to drive and also changing the amount of resistance over the variable resistance circuit assembly. The subroutine will continue to drive the DC electric motor 55 until the "P" or "D" key is released by factory personnel. Thereafter, the software returns to decision block 305 and awaits the depression of another key. Thus, during installation of the shifting apparatus 10, factory personnel may utilize the "P" and "D" keys on the keypad while in Jog mode to control precise movement of the shift position select lever 40 so as to determine the precise position to which the shift position select lever 40 must be moved to obtain each of the various shift positions of the transmission 35. During Jog mode, factory personnel may remove the transmission housing to observe the internal workings of the transmission and visually assure that the exact shift position has been reached.

Referring now to decision block 335, under the Calibrate subroutine, after moving the shift position select lever 40 to a precise location associated with a transmission shift position, factory personnel may toggle the S1-1 switch 240 from the Jog position to the Calibrate position. Toggling the switch S1-1 in this manner causes operation block 307 to change the mode of operation from Jog mode to Calibrate mode. In the Calibrate mode, the keys 212 may be programmed with each of the transmission shift positions. Once in Calibrate mode, the software sets display lamps associated with unprogrammed keys 212 to flash intermittently and sets display lamps associated with keys already programmed with transmission shift positions to illuminate continuously. Upon depression of any of the keys, i.e., "P", "R", "N", "D", "2" or "1", the subroutine reads the potentiometer value associated with the present position of the slidable member 90 and assigns that value to the depressed key 212. For example, by depressing the flashing park key "P" while in Calibrate mode, the Calibrate subroutine reads the potentiometer value based upon the current position of the slidable member 90, e.g., the fully retracted position, and stores that position value associated with the park key in temporary memory. The subroutine sets the park key "P" to illuminate continuously indicating to factory personnel that the "P" key has been programmed with the potentiometer value associated with the fully retracted position. Thereafter, factory personnel may toggle the S1-1 switch back to the Jog mode and by utilizing the "P" and "D" keys, jog the shift position select lever 40 to the next transmission shift position, e.g., the reverse position. Once the position has been precisely reached, factory personnel may repeat the process by toggling the S1-1 switch 240 from the Jog position to the Calibrate position and depressing the flashing "R" key. Upon depressing the flashing "R" key in Calibrate mode, the subroutine reads the potentiometer value associated with the new position of the slidable member 90 and assigns that value to the depressed key 212. The remaining active keys, i.e., "N", "D", "2" or "1", are programmed in a similar manner. Once all of the transmission shift positions have been programmed, they are stored in nonvolatile memory, e.g., an EEPROM. At the end of the calibration cycle, all keys 212 are steadily illuminated indicating that they have been programmed. The keypad 45 emits a steady beep indicating to factory personnel that calibration has been successfully completed. The flashing and steady illumination of the keys and beep tones emitted from the keypad 45 are controlled by operation blocks 308 and 313.

Referring now to operation block 400, there is disclosed therein a subroutine which controls illumination of the vehicle reverse lights. The subroutine ascertains whether the current gear position is reverse and if yes, closes a reverse lights relay to illuminate the vehicle reverse lights.

Returning to FIG. 1, there is shown mounted to the steering wheel 20 an up-arrow key 700 and a down-arrow key 702. The up and down arrow keys 700 and 702 are connected to the controller 200 through a cable assembly 704 that connects to the controller 200 at a position designated on the controller face plate 208 as "Shift Direction-."The up-arrow and down-arrow keys 700 and 702 are enabled for utilization only when the software is set in the Shift mode and provide the driver with a means to shift transmission positions without having to actuate keys on the key pad 45. By depressing the up-arrow and down-arrow keys, 700 and 702, the driver may step through the various transmission positions, one-by-one, until the desired shift position has been reached. The up-arrow and down-arrow keys 700 and 702 may be of particular utility for a handicapped driver not having use of a limb that otherwise would be used for depressing keys on the key pad 45.

Each subsequent time the up-arrow or down-arrow key is depressed, the transmission shifts to the next transmission position as indicated on the face of the key pad 45. For example, if the vehicle transmission is in the park shift position with the park key "P" being illuminated and the driver wishes to shift from park into reverse, rather than depressing the reverse key "R" on the key pad 45, the driver may simply depress the down-arrow key 702 once. Upon depressing this key once, the shifting apparatus 10 will shift the transmission 35 from the park shift position to the reverse shift position. Shifting from park shift position to reverse shift position requires only one press of the down-arrow key 702 since as shown on the key pad 45 (FIG. 6B), reverse is one step down from park. The display lamp associated with the "P" key will turn off and the display lamp associated with the reverse key "R" will illuminate. Likewise, if the vehicle transmission is in the drive shift position (with the drive key "D" being illuminated on the key pad 45) and the driver wishes to shift from drive into park, rather than depressing the park key "P" on the key pad 45, the driver may simply depress the up-arrow key 702 three times to get to park. As shown on the key pad 45 in FIG. 6B, the park key "P" is three steps below the drive key "D". Thus, in order to shift from drive to park, the driver must shift up through neutral "N" and reverse "R" thus requiring the driver to depress the up-arrow key 700 three times. Upon depressing the up-arrow key 702 three times, assuming all safety conditions have been met, the transmission will shift from drive to park.

What is claimed is:

1. A shifting apparatus for use with an automatic transmission, the transmission being situated within a closely confined area within a vehicle and being of the type that includes a housing and a shift position select lever to selectively shift the transmission from a present transmission shift position to one of a plurality of desired transmission shift positions, said apparatus comprising:

a. an operator input means mounted in the passenger compartment of the vehicle that in response to actuation by the vehicle operator is arranged to generate an operator signal representative of said desired transmission shift position;

b. a motor drive assembly mounted within the vehicle at a location remote from the closely confined area and not mounted on the transmission housing, said motor drive assembly being operatively connected to a flexible cable, said flexible cable extending from said remote location and engaging the shift position select lever of the automatic transmission to impart rotational movement thereon; and, c. a processor means including a comparator means for determining said present transmission shift position and being operative in response to receipt of said operator signal representative of a desired transmission shift position differing from said present transmission shift position to energize said motor drive assembly to induce rotational movement of the shift position select lever to a position corresponding to said desired transmission shift position.

2. The shifting apparatus of claim 1 wherein said flexible cable is sleeved, said flexible cable being moveable within said sleeve.

3. The shifting apparatus of claim 1 wherein said motor drive assembly comprises a substantially rigid mounting plate, a motor driven actuator assembly including an output shaft, means for mounting said motor driven actuator assembly to said mounting plate, said output shaft operatively connected to a translational member, said driven translational member being operatively connected to said flexible cable.

4. The shifting apparatus of claim 3 wherein the axis of said output shaft is substantially parallel to the axis of said driven translational member.

5. The shifting apparatus of claim 3 wherein said motor driven actuator assembly includes a housing through which said output shaft extends.

6. The shifting apparatus of claim 2 wherein said sleeve is affixed to the transmission housing.

7. The shifting apparatus of claim 2 wherein said sleeve is affixed to said mounting plate.

8. The shifting apparatus of claim 3 wherein said translational member is moveably secured to said rigid mounting plate by means of a stationary block having a central opening for the passage of said translational member therethrough.

9. The shifting apparatus of claim 8 wherein said stationary block additionally comprises a support sleeve arranged for passage of said output shaft therethrough.

10. The shifting apparatus of claim 8 wherein said means for mounting said motor driven actuator assembly to said mounting plate comprises said stationary block and an additional bracket affixed to said mounting plate.

11. The shifting apparatus of claim 2 wherein said sleeve is flexible.

12. The shifting apparatus of claim 6 wherein said sleeve is affixed to the transmission housing by affixation to a bracket, said bracket being affixed to the transmission housing.

* * * * *